United States Patent [19]

Duggan

[11] Patent Number: 4,858,230

[45] Date of Patent: Aug. 15, 1989

[54] MULTIPORT/MULTIDROP COMPUTER COMMUNICATIONS

[76] Inventor: Robert J. Duggan, 20 Edgewood Rd., Monroe, Conn. 06468

[21] Appl. No.: 50,692

[22] Filed: May 18, 1987

[51] Int. Cl.$^4$ ............................ H04J 3/02; H04J 3/16
[52] U.S. Cl. ...................................... 370/85; 370/96; 340/825.54
[58] Field of Search ...................... 370/85, 90, 94, 95, 370/96; 340/825.5, 825.54, 825.08; 455/2, 5; 358/84, 85, 86

[56] References Cited

U.S. PATENT DOCUMENTS

| | | | |
|---|---|---|---|
| 3,633,169 | 1/1972 | Bickford | 340/172.5 |
| 3,821,706 | 6/1974 | Bennett et al. | 340/163 H |
| 3,921,138 | 11/1975 | Burns et al. | 340/147 R |
| 4,016,548 | 4/1977 | Law et al. | 340/172.5 |
| 4,100,533 | 7/1978 | Napolitano et al. | 340/147 R |
| 4,281,315 | 7/1981 | Bauer et al. | 340/147 R |
| 4,375,691 | 3/1983 | Hackett | 375/8 |
| 4,417,242 | 11/1983 | Bapst et al. | 340/825.05 |
| 4,726,017 | 2/1988 | Krum et al. | 370/96 |

*Primary Examiner*—Benedict V. Safourek
*Assistant Examiner*—Wellington Chin
*Attorney, Agent, or Firm*—Parmelee, Bollinger & Bramblett

[57] ABSTRACT

Multiport/multidrop computer communication is provided over a single communication facility between a plurality of central stations at a central location their respective remote stations at remote locations. Outbound transmissions are multiplexed from a multiport central modem to compatible multiport remote modems. The central stations are monitored to detect which one or ones have invited a response from a remote station and one central station is selected. A signal is sent to the remote modems indicating the selected central station. The signal is combined with the request to send of the invited remote computer associated with the selected central station to enable use of the return transmission lines. The request to send signal line idle or idle code stations are monitored to detect which central stations have invited a remote. Signaling is by RTS-DCD simulation in commercial modems. Another central station is selected if return transmission does not begin within a timer interval. Fast reset is provided if carrier persists after the return transmission has ended.

40 Claims, 4 Drawing Sheets

MULTIPORT/MULTIDROP COMPUTER COMMUNICATIONS

FIELD OF INVENTION

The invention herein relates to multiport/multidrop computer communications wherein a plurality of central stations may communicate from a first location with their respective remote computers at a plurality of remote locations over a single communications facility.

BACKGROUND OF INVENTION

There have been two basic modes of multiple computer communication; namely multidrop (also known as multipoint) and multiport (also known as multiplex). Multidrop networks consist of a plurality of computers attached to a communication line at several locations thereon. Traffic is under control of a central station, which permits orderly responses by remote computers comprising the network. Multiport networks consist of a first plurality of computers at a first location and a corresponding plurality of computers at a second location, utilizing multiplexing modems to divide the transmission time on a communications line.

Many times there are parallel networks using multiple parallel communication lines, at considerable duplicative expense. An example of such situations is found in the banking industry, where a network of teller computers often parallels a network of automatic teller machines. The networks are not necessarily compatible in protocol, speed, or the like. To date there exists no general solution for combining such networks, i.e. combining the capabilities of both multidrop and multiport systems to eliminate multiple, parallel communications facilities.

SUMMARY OF INVENTION

Accordingly, it is a principal object of the invention herein to provide for a plurality of central stations to each communicate with a respective plurality of remote computers over a single transmission facility.

It is another object of the invention herein to save the expense of leasing multiple communication lines and providing multiple modems in connection with the multiple communication lines in order to establish communication between a plurality of central stations and their respective plurality of remote stations at remote locations.

It is a further object of the invention to achieve the foregoing advantages with minimal delays in response time of the networks.

The invention herein provides for communication between a plurality of central stations from a first location with their respective remote computers at a plurality of remote locations over a single communications facility. The single communication facility is typically a leased full duplex telephone line. The invention is carried out by multiplexing transmissions from the plurality of central stations outbound to their respective remote stations, detecting whether invitations to respond have been transmitted by the central stations to their respective remote stations, selecting one central station that has transmitted an invitation to respond, signaling a designation of the selected central station on the communications facility and permitting the remote station receiving an invitation to respond from the selected central station to use the communications facility.

The invention is embodied in a multiport, multidrop communications system for permitting and controlling communication over a single full duplex multidrop transmission facility between a plurality of central stations and a plurality of remote stations respectively associated with each of the central stations, the communications system comprising a central multiport modem having each central station connected to a respective port thereof, a plurality of compatible remote multiport modems connected with the central modem by the single transmission facility, the remote stations respectively associated with each of the central stations being connected to corresponding ports of the remote modems, means associated with the central modem for detecting which one or more of the central stations is awaiting a response from one of its associated remote stations, means associated with the central modem for selecting one of central stations to receive inbound transmission over the single transmission facility, means for signalling the remote modems as to which central station is allowed to receive an inbound transmission, and means permitting transmission from a remote station associated with the selected central station through the corresponding port of the remote modem to which the remote station is connected.

Advantageously, the request to send signals from the central stations are monitored to determine which central stations have sent an invitation to respond and logic elements select one of the central stations having dropped its RTS signal. Line idle or other idle codes can also be monitored for this purpose. Signalling the remote modems is achieved by the signal simulation features of commercially available modems. A particular remote computer is permitted to respond by combining its RTS signal (or other signal indicating a readiness to transmit) with the signal to the remote modems indicating which central station has been selected.

These and other more specific features and objects of the invention herein will in part be apparent to those skilled in the art and will in part appear from a perusal of the following description of the preferred embodiment and claims taken together with the drawings.

DRAWINGS

The same reference numerals refer to the same elements throughout the various figures.

DESCRIPTION OF PREFERRED EMBODIMENT

As noted above, the invention herein relates to a multiport/multidrop communication system wherein multiple central stations can communicate with respectively associated remote stations at remote locations over a single transmission line facility. The system is not dependent upon compatibility of speeds or protocols among the various systems.

Figure 4:
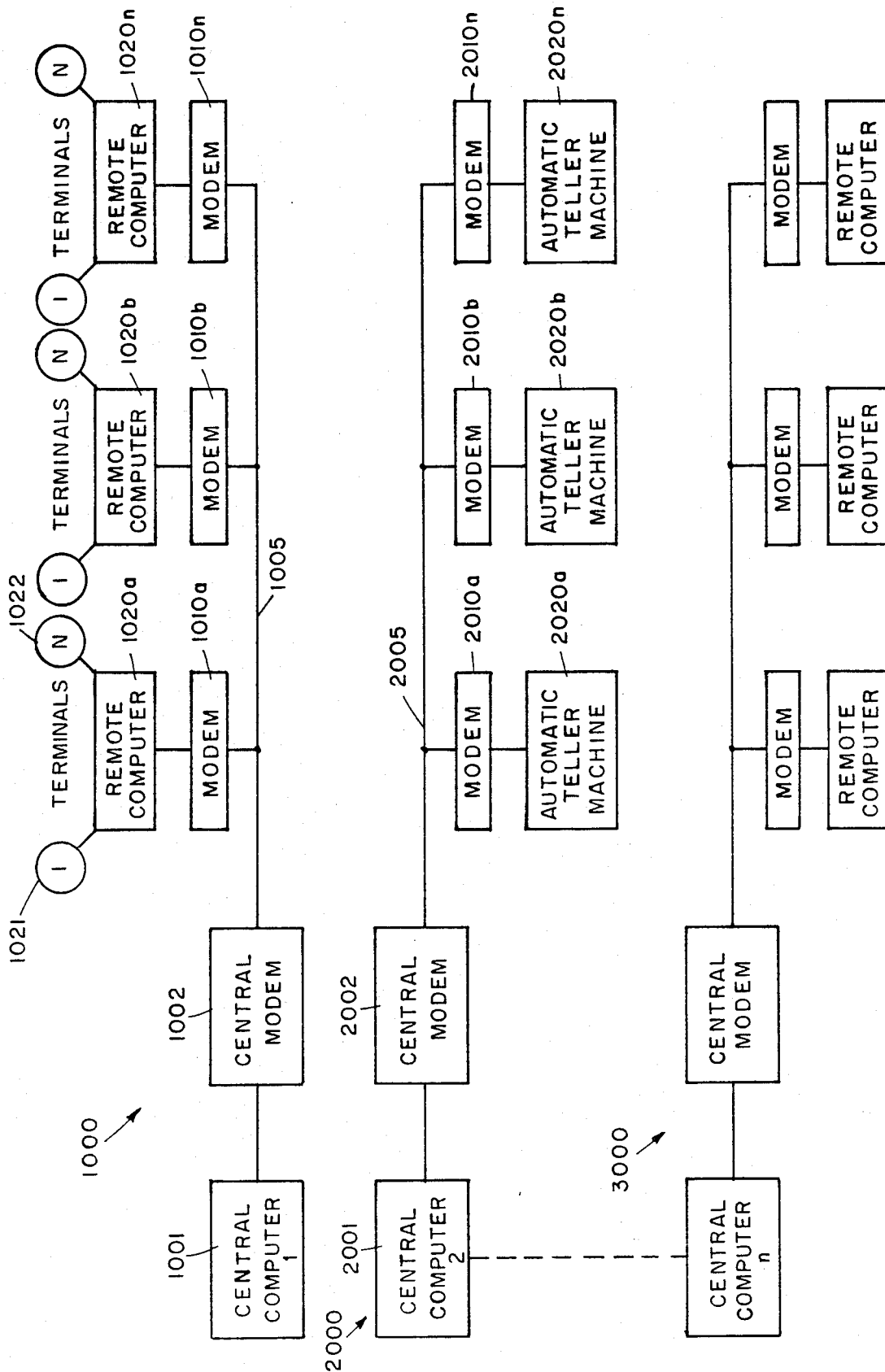
FIG. 4 is a block diagram illustrating a prior art system utilizing multiple communication facilities.

Before turning to a description of a preferred embodiment of the invention, attention is drawn to FIG. 4, which illustrates the prior art data communications systems which are presently in use by banks and other businesses that have multiple central stations each having multiple remote stations at various locations. In the case of a bank, one network consisting of a central station and a remote station at each branch office is used to provide information to tellers at the branches and a second similar network is used to operate automatic teller machines which are typically also located at the same branch offices. Additional similar networks are sometimes used to provide data from another central station to the platform officer of the branch for loan, mortgage or other financial information.

Accordingly, in the prior art system there is a first computer system 1000 comprising a central computer 1001 having its central modem 1002 connected to a four wire full duplex leased telephone line facility 1005. A plurality of modems 1010a–1010n are connected to the transmission line facility 1005, with one modem being provided at each remote location. Each modem connects a remote computer to the transmission line facility, e.g. remote computer 1020a is connected through modem 1010a. The remote computers each have a plurality of terminals, e.g. terminals 1021 and 1022 for a plurality of teller stations at a bank branch office. The remote computers communicate with the central computer over the transmissions line facility 1005 one at a time, typically with the central computer 1000 addressing one of the remote computers which activates its modem to respond, with only one of the remote modems being active at any given time.

The system 1000 described above is essentially duplicated by network 2000 to provide for servicing automated teller machines located at the same branch offices as the remote computers 1020a–n. Thus, the network 2000 comprises a central computer 2001 and a central modem 2002 and full duplex telephone line facility 2005 connecting the central computer with a plurality of remote modems 2010a–n servicing a third, similar network 3000 is provided to handle other functions. Thus, two or more leased telephone line communication facilities are required at considerable cost, and each of the communication facilities must be serviced by multiple modems.

The networks 1000,2000 cannot be combined by connecting the central computers of both networks to a common multiplexing central modem and connecting the remote computers of the both networks to common multiplexing remote modems, because the first central computer might be calling for and receiving a response from one of its remote computers at a first location at the same time the second central computer was calling for and receiving a response from one of its remote units at a different location. Under those circumstances, two of the remote modems would be active on the communication facility at the same time, interfering with accurate data transmission. The invention herein overcomes this problem.

Figure 1:
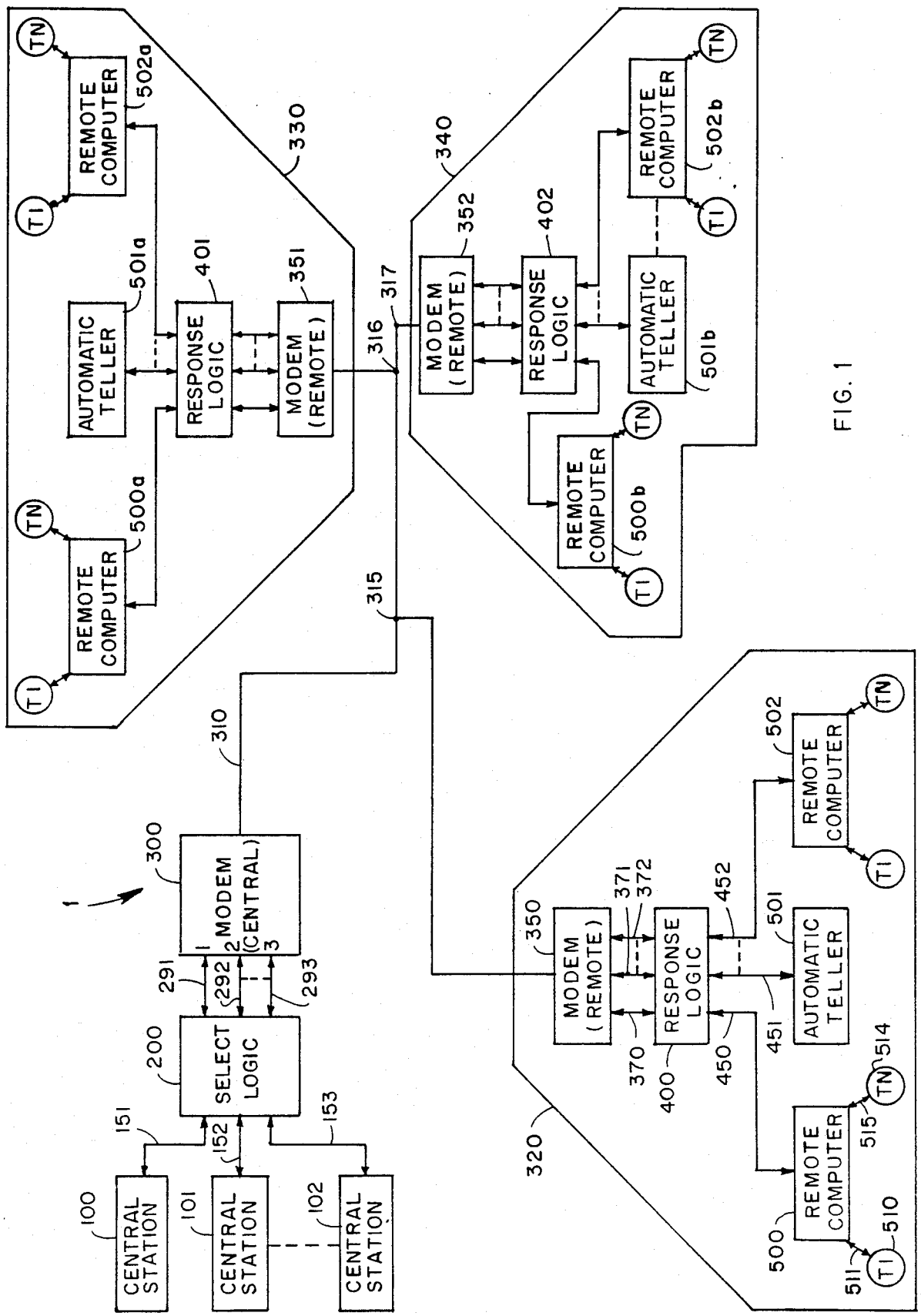
FIG. 1 is a block diagram of a multiport/multidrop communication system according to the invention herein.

With reference now to FIG. 1, there is shown a block diagram of a multiport/multidrop communications system 1 permitting multiple computer systems to communicate over a single transmission line facility according to the invention herein. A plurality of central stations are located at or connected to a central location, and three central stations 100,101 and 102 are shown in FIG. 1. Each of the central stations 100,101 and 102 is connected to select logic apparatus 200, which is in turn connected to a multiport central modem 300 having multiplexing capability as well as other capabilities advantageously facilitating the preferred embodiment of the invention, as more fully discussed below. More particularly, central station 100 is connected to the select logic apparatus 200 by means of a cable 151 having a plurality of individual conductors dedicated to various purposes, as is well known in the art. Many of the individual conductors are merely passed through the select logic 200 and are connected to the central modem 300 via cable 291. Others of the individual conductors are broken or tapped in the select logic and their signals modified and/or utilized as more fully described below. The signals modified or generated by the select logic 200 are also connected to the first port of the central modem 300 by cable 291. The second central station 101 is similarly connected to the second port of the central modem 300 over cables 152 and 292, also through the select logic 200. Additional central stations such as central station 102 may also be connected to additional ports of the central modem through the central logic by means of cables, such as cable 153 and cable 293. The preferred embodiment described herein has three central stations and the modems have three ports, which provides good response time under steady traffic.

The multiport central modem 300 is connected to a communication facility, which in the preferred embodiment is a four wire full duplex telephone line facility 310. At each remote location, which may be a bank branch as an example, a multiport remote modem with multiplexing capability is connected with the telephone line communication facility 310. In FIG. 1, at a first remote location 320, a multiport remote modem 350 is shown connected to the telephone line communication facility 310 at bridge 315. The three ports of the remote modem 350 are respectively connected through a response logic apparatus 400 with remote computers at the branch location. More particularly, remote computer 500 is connected by cable 450 to the response logic 400 and by cable 370 to the remote modem 350. The cables 370 and 450 are multiple conductor cables some of which are merely passed through the response logic and some of which are broken or tapped for utilization in the response logic 400. The remote computer 500 may have a plurality of individual terminals, such as terminal 510 and 514 connected to its registers over cables 511, 515, respectively.

The remote computer 500 is part of a network with central station 100 which will communicate over ports 1 of the central and remote modems. Similarly, automatic teller machine 501 is connected with port 2 of the remote modem 350 by cables 451 and 371, through the response logic apparatus 400, and automatic teller machine 501 is part of a network with central station 101. Also similarly, remote computer 502 is part of a network with central station 102 and communicates through ports 3 of the central modem 300 and the remote modem 350, with cables 372 and 452 connecting the remote computer with the remote modem 350 through the response logic 400.

Two additional remote locations 330 and 340 are generally indicated in FIG. 1. At location 330, there is a remote modem 351, an associated response logic apparatus 401 and remote computer 500a, automatic teller machine 501a and remote computer 502a, which are respectively part of the networks of central stations 100, 101 and 102. Cable connections from the communication facility 310 to the remote modem 351 (tapped at bridge 316) and from the ports of the remote modem through the response logic 401 to the remote computers 500a, 502a and the automatic teller machine 501a are similar to those described above at location 320. A third location 340 includes remote modem 352 connected to the communication line at bridge 317, response logic 402 and remote computer 500b, automatic teller machine 501b and remote computer 502b. The units 500b, 501b and 502b are connected to the modem ports used by the networks of which they are a part. It will be appreciated that there are as many remote modems, response logic apparatuses, remote computers and automatic teller machines as there are locations to be serviced, and in typical installations for a bank there may be six to eight remote locations per line, typically branch offices of the bank, serviced by one telephone communication facility.

The central stations 100-102 control the multidrop (or remote location) polling of the respectively associated remote computers 500-500b, 501-501b, 502-502b, etc. Each of the central stations operates programmatically the same as it would in a prior art multidrop system. In general, this operation takes the form of the central station inviting a particular one of its remote stations to transmit a return message or response. (The automatic teller machines are a specialized form of remote computer, and will not always be designated separately as automatic teller machines.) Once the invitation to transmit has been sent, the central station awaits a response from the invited remote computer. In the multipoint/multidrop system according to the invention herein, these outbound invitations to respond as well as data or other transmissions intended for the remote computers are multiplexed and transmitted over the outbound half of the full duplex communication facility to be received at the various modems. The request to respond or other data is accepted by one of the remote computers, according to the designation provided by the central station and recognized by the remote computer.

Upon sending an invitation to respond, the central station ceases to transmit invitations or data and awaits a response from its invited remote computer. As noted above, only one of the remote modems may utilize the "return" half of the full duplex communication facility at any given time.

According to the invention herein, the output of each of the central stations is monitored to determine when one of these stations has invited one of its remote stations to transmit a response. In the embodiment disclosed, this is accomplished in the select logic apparatus 200, as will be more fully discussed below. A signal is generated indicating which port of the multiport remote modems may be activated to send a return signal, i.e. that remote modem port corresponding to the central modem port to which the central station awaiting a return transmission is connected. The port designating signal is received at the remote modems, and the remote computer which has been invited to transmit activates the sending facility of the remote modem at its particular location, and commences the send operation. In the embodiment shown, this is accomplished in the response logic apparatus, as also described below.

It will be appreciated, however, that the detection of invitations to respond from the central stations, the generation and sending of signals permitting response to the remote modems at the remote locations and the utilization of those signals to enable a particular remote modem to be activated for sending a return transmission, may all be accomplished by software and/or firmware provision in the microprocessors that are already part of some commercially-available modems. Further methods of carrying out the invention herein will also be apparent in describing the select logic and remote logic apparatus and their operation.

Figure 2:
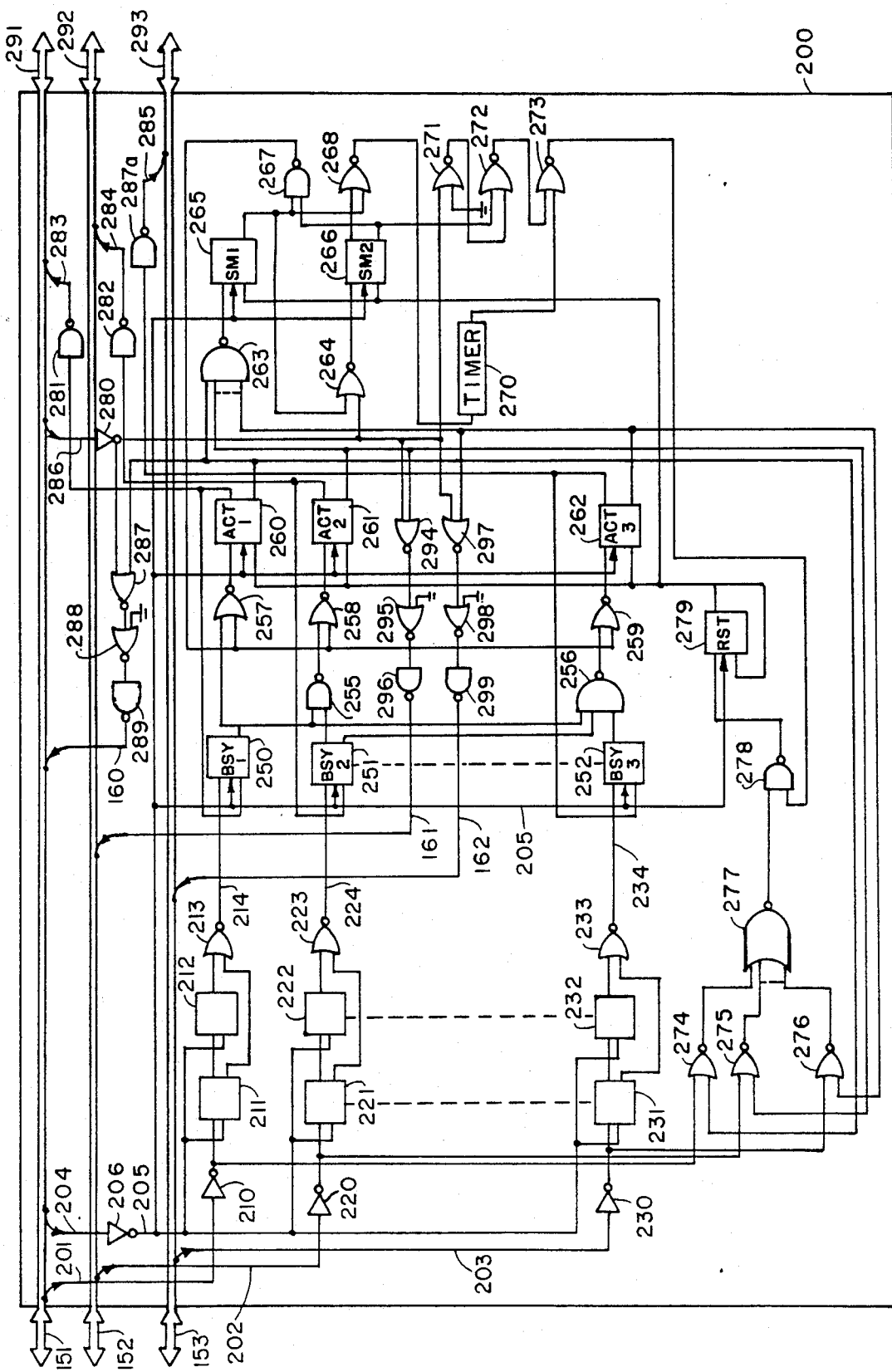
FIG. 2 is a schematic circuit diagram of the select logic portion of the block diagram of FIG. 1.
Figure 3:
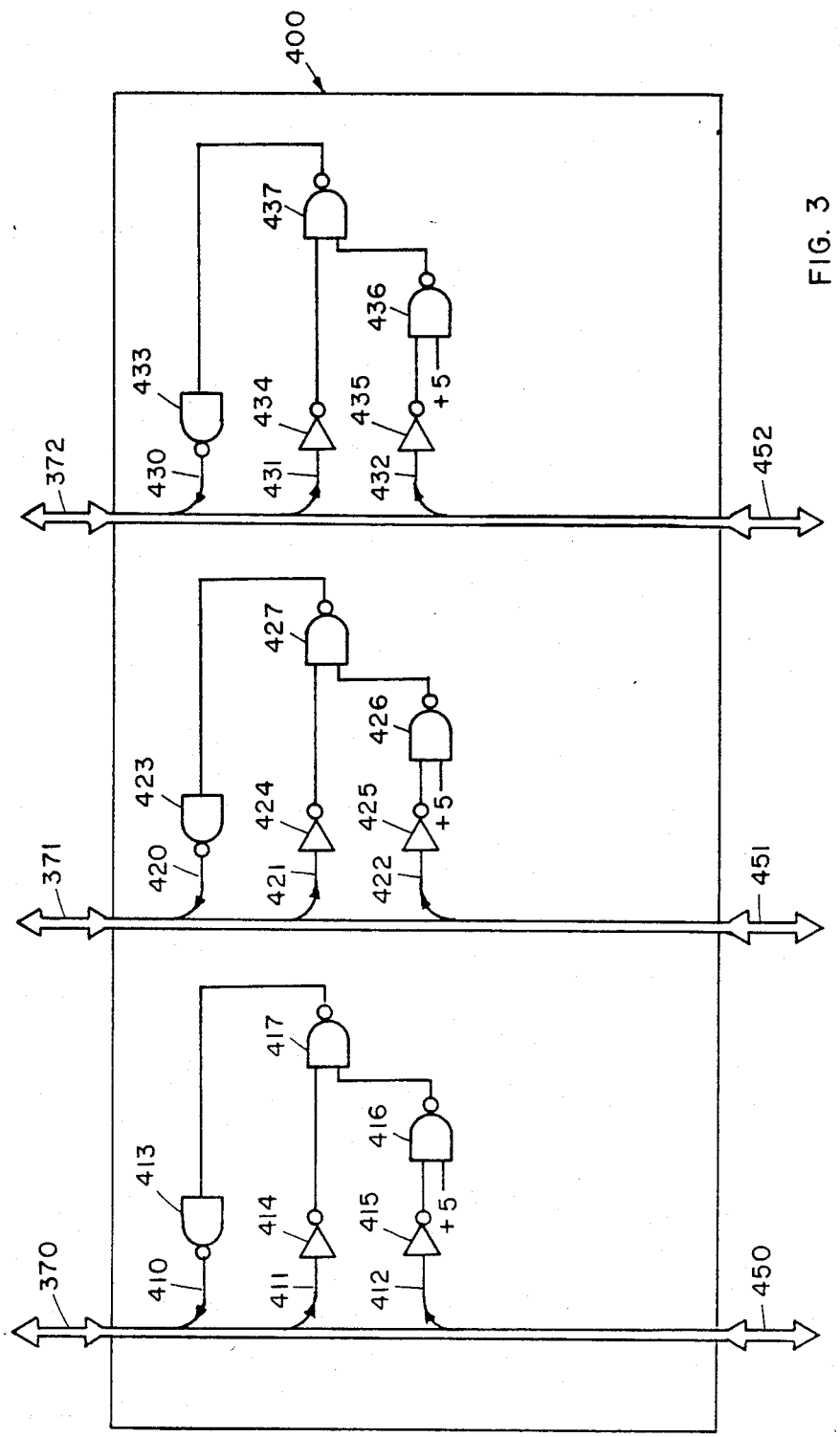
FIG. 3 is a schematic circuit diagram of the response logic portion of the block diagram of FIG. 1.

The schematic circuit diagrams of FIGS. 2 and 3 provide a means to selectively allow a particular invited remote computer to transmit based on a signal sent to it as a result of information derived in and transmitted from the select logic and acted upon by the response logic. With reference to FIG. 2, cable 151 connecting central station 100 with the select logic 200 is a standard EIA-RS 232C cable comprising a plurality of individual conductors, as are cable 291 connecting the select logic 200 to the central modem 300 and the other connecting cables. The select logic 200 provides direct connections from cable 151 to cable 291 with the exceptions discussed below. In the direction from cable 151 to 291, all signals pass directly through the select logic except the signal known as "request to send," sometimes herein referred to as "RTS". The RTS signal appears on pin 4 of cable 151 and is broken out on lead 201. Similarly, signals from central station 101 are carried on cable 152 and passed through to cable 292, with the exception of the RTS signal for central station 101, the conductor for which is broken out and onto lead 202. Lead 203 is broken out from cable 153 and carries the RTS signal for central station 102, which otherwise communicates with the third port of the central modem 300 via cables 153 and 293. The RTS signal appearing on lead 201 is regenerated on lead 283 connected to pin 4 of cable 291, in the manner described below, and the RTS signals on leads 202 and 203 are similarly regenerated on leads 284, 285 connected to cables 292 and 293.

In the direction from cable 291 to cable 151, all signals, except one on line 286, pass directly through the select logic. Also, line 204 carries the transmit clock from port 1 of the central modem, which is tapped from pin 15 as a convenient source of a clock for the select logic 200. The clock appears on line 205 from receiver 206.

A data carrier detect signal, normally produced at pin 8 of the central modem is broken out on line 286 to the select logic. When the central modem 300 detects carrier signal inbound from one of the remote modems, the central modem provides a data carrier detect signal to all of the central stations on cables 291-293. Therefore, the signal may be monitored from port 1 only. The data carrier detect signal is often referred to herein as "DCD". Although the DCD signal may be monitored from port 1, it is often necessary for orderly operation of the central stations that DCD be presented only to the central station allowed to receive a reply. If other central stations see the DCD when they are not allowed to receive a reply, they may interpret the signal as a system error and cease transmission of outbound traffic, which would otherwise continue on the multiplexed basis. Therefore, a DCD signal for central station 100 is regenerated on line 160 by gates 287, 288 and driver 289, with the inputs to gate 287 being the DCD signal on line 286 and the "Active 1" flip flop 260. The DCD signal for central station 101 is regenerated on line 161 by gates 294, 295 and driver 296, with inputs 286 and "Active 2" flip flop 261. Similarly, the DCD signal for central station 102 is regenerated on line 162 by gates 297, 298 and driver 299, from inputs 286 and "Active 3" flip flop 262. The setting of the active flip flops will be discussed below.

The foregoing signals on the cables 151-153 and 291-293 are at EIA levels of plus or minus 12 volts and are connected to industry standard 1489 receivers 206, 210, 220, 230 and 280, respectively, to convert the signals to 5 volt levels for use with industry standard 7400 series integrated circuits used in select logic 200. Drivers 281, 282, 282a, 289, 296 and 299 are standard 1488 line drivers to convert from the 5 volt logic level to the EIA plus or minus 12 volt transmission levels.

The general function of the select logic apparatus 200 is to monitor the state of each central station and its relationship with its remote computers, with respect to whether a central station requires use of the return portion of the communication facility for receiving transmissions from one of its remote computers. The further general function of the select logic apparatus is to select one of the central stations awaiting use of the return transmission facility and to enable return transmission to that central station.

Still referring to FIG. 2, when the central station 100 is not expecting a response, the RTS signal on line 201 is high and causes the output of receiver 210 to be low. The D-type flip flops 211 and 212 are both reset, and the output of gate 213 on line 214 is low.

When the RTS signal from central station 100 on line 201 drops to low, it is inverted by receiver 210 and applies a high signal to the input of flip flop 211. Thus, flip flop 211 sets upon receipt of the next clock pulse on line 205. This causes line 214 to be high and also places a high input on D-type flip flop 212. D-type flip flop 212 is set on the subsequent clock pulse appearing on line 205, which then drops the signal on line 214. Thus, the sequential setting of the two flip flops 211 and 212 creates a single positive pulse to the input of the JK flip flop 250, labeled "BSY1" for "Busy 1" in the Figure.

The single positive pulse was applied to Busy 1 flip flop 250 during the same clock pulse that set flip flop 212. Busy 1 flip flop is set on that pulse and remains set when the signal on line 214 drops to low. Thus, the single positive pulse is "locked up" in Busy 1 flip flop 250 to indicate that central station 100 is awaiting a return transmission from one of its remote computers and requires use of the return portion of the communication facility.

Busy 2 flip flop 251 is similarly utilized to indicate that central station 101 is awaiting a response from one of its remote computers. The pulse which is locked into Busy 2 flip flop 251 is created when the RTS signal on line 202 goes low, operating flip flops 221, 222. The pulse is provided to flip flop 251 through gate 223 on line 224 and flip flop 251 is set on the same clock pulse that sets flip flop 222. Busy 3 flip flop 252 provides the same function with respect to central station 102, through the chain consisting of flip flops 231, 232 and gate 233 inputted to flip flop 252 over line 234.

It will be appreciated that there may be additional central stations beyond the three shown in the preferred embodiment, as indicated by the dashed lines in FIGS. 1 and 2, and that a busy flip flop would be provided for each such central station. It will also be appreciated that the busy flip flops 250, 251 and 252 are operated solely by a particular associated central station, and that the central stations do not require communication or coordination with each other or even common protocols in setting the busy flip flops. Rather, because the operation of each host station is asynchronous and independent, any or all of the busy flip flops 250, 252 or 252 may be set at the same time.

Each central station and its central modem port has an additional "active" flip flop associated therewith in the select logic 200. Thus, central station 100 and its busy flip flop 250 are associated with active flip flop 260, central station 101 and its busy flip flop 251 are associated with active flip flop 261, and central station 102 and its busy flip flop 252 are associated with active flip flop 262. Only one of these active flip flops 260, 261 and 262 may be set at any one time, because the active flip flops allow inbound communication for their particular central station, modem port and associated remote computer network. This is accomplished as follows.

Flip flops 265 and 266 provide state logic to control the flow of events while providing services to the central station and its remote computers on a particular port. When there are no transmissions incoming to the central stations, or just after an incoming transmission has terminated on any of the ports, flip flops 265 and 266 are both reset and flip flops 260, 261 and 262 are also reset, as will be more fully explained below. With flip flops 265 and 266 in their reset condition, the output of gate 267 is low, indicating the inactive state, and the low output of gate 267 enables gates 257, 258 and 259 leading to the active flip flops 260, 261 and 262, respectively.

Gates 255 and 256 provide a priority ranking for setting the active flip flops 260, 261 and 262. As shown, priority is given to central station 100 connected to port 1 of the select logic 200 and modem 300, with the next highest priority being given to central station 101 on port 2 and the lowest priority being given to central station 102 on port 3. If such priority ranking is not desired, then gates 255 and 256 can be replaced with a shift register having a single circulating bit, thus giving equal priority to the ports.

In the embodiment shown, if busy flip flop 250 has been set, indicating that central station 100 requires to use the return portion of the communication facility 310, then active flip flop 260 will set on the next clock pulse on line 205. Gates 255 and 256 prohibit active flip flops 261 and 262 from being set at the same time regardless of the condition of busy flip flops 251 and 252. However, if busy flip flop 250 is not set and busy flip flop 251 is set, indicating that the central station 101 requires use of the return communications lines, then gate 255 operates to permit setting of active flip flop 261, while gate 256 continues to prevent setting of active flip flop 262. Similarly, if busy flip flop 252 is set and busy flip flops 250 and 251 are not set, gate 256 permits active flip flop 262 to be set.

Returning to the situation wherein active flip flop 260 has been set, line 283 will go low through driver 281, lead 283 being provided on pin 4 of cable 291. This is the regenerated RTS signal from central station 100; however, the select logic 200 has permitted an RTS signal to pass from only one central station even if more than one central station has dropped its RTS signal. This RTS signal is further utilized, as described below, to allow the remote station that has been invited and its associated remote modem to transmit, utilizing the communication facility.

When the active flip flop 260 is set, the output of gate 263 will be high. On the next clock transmission on line 205, the busy flip flop 250 will be reset, as there is no further need to lock up the drop in RTS signal once the process of facilitating return transmission has begun. Also on that next clock pulse, the state logic flip flop 265 will be set, causing the output of gate 267 to go low and disable the inputs to active flip flops 260, 261 and 262. The output of gate 268 also goes high, initiating operation of timer 270.

The timer provides a delay period for the remote station to begin its transmission procedure. In normal operation, the remote modem servicing the selected remote computer establishes carrier signal a short time after being "allowed" to transmit by the regenerated RTS signal produced on line 283. The successful establishment of carrier results in a data carrier detect (DCD) signal on line 286 which causes the output of receiver 280 to go low. This low, DCD-derived signal from receiver 280, through gate 264, causes state logic flip flop 266 to set on the next clock signal on 205. Gate 268 then goes low and turns off the timer 270, provided the data carrier detect signal has been received within the timer interval. If the timer interval expires prior to receipt of the data carrier detect signal, the timer signal causes gate 273 to go low and initiate a reset of the central station selection process. The timer interval is set in accordance with the characteristics of the central stations and remote computers of the networks, and a timer interval of approximately two hundred milli seconds, and for some equipment much less is practical. JK type flip flop 279 is the "reset" flip flop for the select logic, which is set through gate 278 upon expiration of the timer or in other ways, as more fully discussed below.

In the usual operation, the data carrier detect signal is timely received and the transmission from the selected remote computer to the active central computer is accomplished over the return transmission lines of the full duplex communication facility 310, through central modem 300 and cables 291 and 151 connected through the select logic 200. Once the transmission is completed, the remote modem drops its carrier wherein the data carrier detect signal on line 286 drops and causes the output of receiver 280 to go high. This signal is applied to gate 272 (through gate 271), and because state logic flip flop 266 was set when the data carrier detect signal was established, and remained set, the output of gate 272 will go high upon the drop in DCD. This sets the reset flip flop 279 through gates 273, 278, on the next transition of the clock signal on line 205. On the next following transition of the clock signal on line 205, reset occurs on the state logic flip flops 265 and 266, as well as the reset flip flop 279 itself. Reset will also occur on the one of the active flip flops 260, 261 or 262 that has been set to service its respectively associated central computer according to the priority logic. When the active flip flop 260, 261 or 262 is reset, its associated RTS signal on line 283, 284 or 285 goes high.

Described above are two ways the reset flip flop 279 can be set; namely, through gate 272 upon a drop in the data carrier detect signal at the end of a data transmission, and by operation of the timer 270 if the data carrier detect signal does not come up promptly to indicate establishment of transmission. An additional means of setting the reset flip flop 279 is provided for the situation in which carrier signal from the remote modem persists beyond the completion of the transmission of data from the enabled remote computer to the active central station, due to modem circuit delays and the like. If the central station is fast enough, it may digest the transmission and attempt to send another transmission outbound by raising its request to send signal on line 201. This is not an error condition, but to minimize the delay, a fast operation of reset flip flop 279 is accomplished through gates 274 and 277. Similarly, the fast resetting operation can be accomplished through gates 275 or 276 if central station 101 or 102, respectively, was the one which has just received a transmission and was now reestablishing outbound transmission.

With reference to FIG. 1, the foregoing discussion has explained how the select logic 200 operates to provide one and only one drop in the RTS signals from central stations 100, 101 and 102 to the central modem 300 at any one time. With the priority scheme described, if the RTS signal from any of the central stations 100, 101 or 102 drops and the RTS signal from the remaining central stations remains high, the select logic will in effect pass the drop in RTS signal to the corresponding port of the central modem, and will not permit a drop in RTS signal from the other central stations to pass to the central modem until the central station being serviced has completed reception of its transmission. If two or more of the central stations have dropped RTS signals at the same time, the select logic passes the drop to RTS signal for the lowest numbered port.

Commercially availably modems have features which facilitate the invention herein without necessity of providing elements beyond those described. The modems used in the preferred embodiment are Omnimode 96 modems made by Racal-Milgo Information Systems of Fort Lauderdale, Fla. Other commercially available modems have similar features, which are discussed below.

One feature of the modems utilized at the central location is "strapped on carrier." Thus, the central modem 300 continuously transmits carrier signal on the transmit lines of the transmission facility 310, even when the central station associated with the port has dropped its RTS signal indicating that the central station is not sending messages but is instead awaiting return messages from a remote computer. The strapped on carrier is efficient because when a computer is ready to transmit, the modem has carrier signal available and can provide an immediate clear to send signal, whereby there is no delay in initiating outbound transmissions. This is the most efficient way of utilizing the outbound transmission lines of the full duplex telephone line communications facility.

Another feature of the Racal-Milgo Omnimode 96 modem which is used in the preferred embodiment herein is the "Request-to-Send--Data-Carrier-Detect Simulation" aspect of the control signal simulation feature. The RTS-DCD signals between modems can be simulated on individual ports of multiport Omnimodes. When the RTS signal is simulated on a port, the DCD signal automatically responds.

Thus, and with reference to FIG. 1, even though the carrier signal from central modem 300 to the remote modems 350, 351 is strapped on to run continuously, the data carrier detect (DCD) signal at each port of remote modems 350, 351, 352 will follow the RTS signal at its associated port of the central modem 300. When the RTS signal generated by select logic 200 on lead 283 of cable 291 feeding port 1 of central modem 300 goes low, the DCD signal in cable 370 emanating from port 1 of remote modem 350 also goes low, as does the DCD signal on port 1 of each of the remaining remote modems 351, 352. Similarly, the DCD signal at port 2 of each of the remote modems goes low when the RTS signal lead on 284 of cable 292 goes low, and the DCD signal on port 3 of each of the remote modems goes low when the RTS signal goes low on port 3 of the central modem. Taken together with the function of the select logic permitting the RTS signal on only one port to be low at any given time, this provides a way of signalling to the remote modems at the remote locations as to which port is enabled to send a return transmission. A particular remote computer on the enabled port at one of the remote locations will actually make the return transmission, based on whether it was invited to do so by its associated central station.

With reference now to FIG. 3, there is shown as schematic diagram of the response logic 400 which, as is shown in FIG. 1, is connected between the remote modem 350 and the remote computers 500, 502 and automatic teller machine 501. Remote computer 500 is part of the network with central station 100, and is connected to port 1 of the remote modem 350 through cable 370, the response logic 400 and cable 450. Automatic teller machine 501 is part of a network with central station 101, and is connected with port 2 of the remote modem 350 via cable 371, the response logic 400 and the cable 451. Similarly, remote computer 502 is part of the network with central station 102 and is connected with port 3 of the remote modem through cables 372, 452 and the response logic 400.

Turning again to FIG. 3, it will be appreciated that the cables 370–372 and 450–452 are the standard multiconductor cables and that most of the individual conductors are connected through the response logic 400.

The data carrier detect signal, whether actual or, for the purposes of the preferred embodiment herein, from the simulation described above, appears on pin 8 of port 1 of the remote modem and is tapped in the response logic 400 on line 411 and receiver 414. Similarly, the data carrier detect signal for port 2 is tapped o line 421 and receiver 424 and for port 3 on line 431 and receiver 434. These signals are applied to gates 417,427 and 437 for ports 1 to 3, respectively. The RTS or request to send signal from the remote computer 500 is broken out from pin 4 on line 412 to receiver 415, and passes through gates 416 and 417 to driver 413, which feeds pin 4 of the modem 350 on line 410 when gate 417 is enabled. Ports 2 and 3 are similar. For port 2, the RTS signal from pin 4 of cable 451 from ATM 501 is broken out on line 422 to receiver 425, and passes through gates 426 and 427 (when enabled) to driver 423 which is connected to pin 4 of port 2 of the modem 350 on line 420 of cable 371. The elements associated with port 3, namely lines, receivers, gates and drivers 430–437 are similarly connected. It will further be appreciated that the response logic 401 and 402 connected between remote modems and remote computers at other locations is also the same. The response logic 400, although shown as a separate entity of receivers, gates and drivers, may also be provided as a part of the remote modem, or its function accomplished by programmed operation of a microprocessor of the remote modem.

Considering first the situation wherein the central station 100 has dropped its RTS signal, indicating that is expects a return transmission and thereby requesting use of the return lines of the communication facility 310, the drop in RTS signal results in the setting of active flip flop 260 of the select logic and the dropping of the regenerated RTS signal on line 283 connected to port 1 the central modem 300, as best seen in FIG. 2. By virtue of modem operation in simulating RTS-DCD, there results in a drop in the signal on line 411 at port 1 of the remote modem 350 as well as the drop on the corresponding line in the response logic servicing ports 1 on the remaining remote modems. Assuming that remote computer 500 was requested to respond by central station 100, the invitation to respond is received at the remote computer 500, and the remote computer 500 raises its request to send signal. This is standard operating procedure for turning on carrier at the modem 350 preparatory to transmitting the response message. With reference to FIG. 3, the request to send signal from remote computer 500 is broken out on line 412 and applied to one input of gate 417. As described above, the data carrier detect signal for port 1 is applied to the other input to gate 417, thereby enabling the gate and permitting the request to send signal to pass from remote computer 500 to modem 350. Modem 350 then turns on its carrier, and clears remote computer 500 to transmit.

If the invitation to transmit had been sent to remote computer 500a rather than remote computer 500, then remote computer 500a would have raised its request to send signal, and then it would have been cleared to transmit through modem 351. The central stations in the networks operate such that only one associated remote computer is invited to respond at any one time. This operation is standard in multidrop networks as shown in FIG. 4. Combined with the ability of the select logic and response logic to enable one set of ports, only one remote computer is permitted to use the return portion of the communication facility at any given time.

Once the transmission from the remote computer is complete, its request to send signal drops, carrier from the modem is discontinued, and the select logic 200 is reset. This occurs when the DCD signal on line 286 drops, setting the reset flip flop through gates 271–273 and 278. The reset logic 200 is then ready to select a central station to use the transmission facility 310, as described above.

In summary, the select logic and remote logic described above permits multiple central stations and associated networks of remote computers over a single communication facility. This is accomplished by monitoring the central computers to determine what ones of them desire transmissions from one of their remote computers, selecting one of the central computers to use the return transmission lines to receive a response and enabling the ports of the remote modems to which the remote computers associated with the selected central station are connected, whereby the particular remote computer which has been invited to respond may do so through the enabled port of its remote modem. In the broader sense, the invention herein selects one of several central stations for receiving a response, and permits a response from only one remote computer at a time, thus provided for the orderly sharing of the return transmission lines in the communication facility.

It will be appreciated that the description above is of a preferred embodiment and that there are many different ways of achieving the invention herein which will be obvious and useful to those skilled in the art. For instance, although it is convenient to determine which central stations have transmitted an invitation to respond by monitoring RTS signals from the central stations, there are other acceptable ways of detecting which central stations have invited remote computers to transmit a response. As an example, a line idle condition or a code indicating line idle can be monitored and it is also feasible, although less desirable from a time and complexity standpoint, to decode transmissions from the central stations to detect invitations to respond.

Although use of the RTS-DCD simulation available in the Racal-Milgo Omnimode 96 modems is an efficient and readily available means for signalling to the remote locations which port is to be active, the signalling can be accomplished in other satisfactory ways as well. For instance, the signal could be transmitted as data to a spare port set aside for this purpose, or could be sent via a data or subcarrier secondary channel. The signal could also be sent during a forced interruption of other transmissions. Further, at the remote locations, the means of determining which ports should be active must merely be compatible with the means for sending the information to the remote modems.

Those familiar with the art will recognize that while the devices at the central location have been designated "central stations," the term encompasses mainframe computers, communications front ends, or even additional modems connecting other devices not located at the central stations. Similarly, the devices at the remote locations, although designated as remote computers and automatic teller machines, may be other networked devices, such as display controllers, terminals, or even modems for other additional devices.

It will further and especially be appreciated that the invention herein can be carried out in software or firmware and that in particular, modems such as the Omnimode 96 have internal microprocessor units which can be programmed to accomplish the steps of the invention herein, rather than using discreet logic elements.

Accordingly, the description of the preferred embodiment set forth above is illustrative only and the scope of the invention herein is limited only by the following claims and the equivalents to which the elements and steps are fairly entitled.

I claim:

1. A method of controlling communication over a single communication facility between a plurality of central stations and at least one remote station respectively associated with each of the central stations, the method comprising:
   (A) multiplexing transmissions from the plurality of central stations outbound to their respective remote stations;
   (B) detecting that an invitation to respond has been transmitted by at least one of the plurality of central stations to their respective remote stations;
   (C) preventing any remote station that has received an invitation to respond from responding until it is permitted to do so;
   (D) selecting one of the at least one of the plurality of central stations that has transmitted an invitation to respond;
   (E) signaling an indication of the selected central station on the communication facility; and
   (F) permitting the remote station that received an invitation to respond from the selected central station to use the communication facility in response to the signal of the selected central station on the communication facility.

2. A method of controlling communication as defined in claim 1 wherein detecting that an invitation to respond has been transmitted by at least one of the plurality of central stations includes monitoring outbound transmissions from the plurality of central stations.

3. A method of controlling communications as defined in claim 1 wherein the plurality of central stations are of the type which generate a request to send signal and detecting that an invitation to respond has been transmitted by at least one of the plurality of central stations includes monitoring the request to send signals from the plurality of central stations.

4. A method of controlling communications as defined in claim 1 wherein detecting that an invitation to respond has been transmitted by at least one of the plurality of central stations includes monitoring for line idle condition in the outbound transmissions from the plurality of central stations.

5. A method of controlling communications as defined in claim 1 wherein selecting one central station that has transmitted an invitation to respond includes prioritizing the plurality of central stations and selecting the highest priority central station that has transmitted an invitation to respond.

6. A method of controlling communications as defined in claim 1 wherein selecting one central station that has transmitted an invitation to respond includes establishing a rotating priority among the plurality of central stations and selecting the next central station in the rotating priority that has transmitted an invitation to respond.

7. A method of controlling communications as defined in claim 1 wherein selecting one of the plurality of central stations that has transmitted an invitation to respond includes selecting a second central station that has transmitted an invitation to respond if the first selected central station does not receive a response within a pre-selected timer limit.

8. A method of controlling communications as defined in claim 1 wherein signaling an indication of the selected central station includes sending a request to send simulation on the outbound lines of the communication facility.

9. A method of controlling communications as defined in claim 8 wherein the signaling comprises request to send simulation on the individual ports of multiplexing multiport modems connecting the stations with the communication facility.

10. A method of controlling communications as defined in claim 1 wherein signaling an indication of the selected central station includes transmitting a signal designating a port of multiplexing multiport modems connecting the remote stations with the communication facility at the remote locations and directing the signal to a spare port of the remote modems.

11. A method of controlling communications as defined in claim 1 wherein signaling an indication of the selected central station includes transmitting the signal on a secondary channel of the communications facility.

12. A method of controlling communications as defined in claim 11 wherein the secondary channel is a sub-carrier frequency carried on the communications facility.

13. A method of controlling communications as defined in claim 11 wherein the secondary channel is a secondary data channel.

14. A method of controlling communications as defined in claim 1 wherein signaling an indication of the selected central station is carried out during an interruption in multiplexing outbound transmissions from the plurality of central stations.

15. A method of controlling communications as defined in claim 1 wherein permitting the remote station to respond includes combining a signal from the remote station indicating that it is ready to respond with the signal indicating the selected central station.

16. A method of controlling communications as defined in claim 15 wherein the signal from the remote station is a request to send signal.

17. A method of controlling communications as defined in claim 2 wherein selecting one central station that has transmitted an invitation to respond includes prioritizing the plurality of central stations and selecting the highest priority central station that has transmitted an invitation to respond.

18. A method of controlling communications as defined in claim 3 wherein selecting one central station that has transmitted a request to respond includes prioritizing the plurality of central stations and selecting the highest priority central station that has transmitted an invitation to respond.

19. A method of controlling communications as defined in claim 18 wherein signaling an indication of the selected central station includes sending a request to send simulation on the outbound lines of the communication facility.

20. A method of controlling communications as defined in claim 19 wherein permitting the remote station receiving an invitation to respond to use the communication facility includes combining the signal indicating the selected central station with a signal generated by the remote station indicating it is ready to send to the selected central station.

21. A method of controlling communications as defined in claim 19 wherein the signal from the remote station is a request to send signal.

22. A method of controlling communications as defined in claim 20 wherein selecting one central station that has transmitted to respond includes selecting a second if the first selected central station does not receive a response within a pre-selected timer limit.

23. A method of communicating over a single communication facility between a plurality of central stations at or connected to a central location and respectively associated remote stations at remote locations, the method comprising:
(A) multiplexing transmissions from the plurality of central stations outbound to their respective remote stations over the outbound portion of the communications facility;
(B) detecting whether one or more of the central stations desires to receive a return communication from one of its respective remote stations;
(C) preventing any remote station that desires to send a communication to its associated central station from doing so until permitted;
(D) selecting at least one of the plurality of central stations that has been detected as desiring to receive a return communication from one of its remote stations;
(E) transmitting an indication of the selected central station on the communication facility; and
(F) permitting a remote station desiring to send a communication to the selected central station to use the communication facility in response to the transmitted indication of the selected central station on the communication facility.

24. A method of controlling communication as defined in claim 23 wherein detecting whether one or more of the central stations desires to receive a return communication from one of its respective remote stations includes monitoring outbound transmissions from the central stations.

25. A multiport/multidrop communications system for permitting and controlling communication over a single transmission facility between a plurality of central stations and a plurality of remote stations respectively associated with each of the central stations, the communications system comprising:
(A) a central multiport modem having each of the plurality of central stations connected to a respective port thereof;
(B) a plurality of compatible remote multiport modems connected with the central modem by the single transmission facility, the remote stations respectively associated with each of the plurality of central stations being connected to corresponding ports of the remote modems;
(C) means associated with the central modem for detecting which one or more of the central stations desires a response from one of its associated remote stations;
(D) means associated with the central modem for selecting the one or more central stations that has been detected as desiring a response from a remote station to receive inbound transmission over the single transmission facility;
(E) means for signaling to the remote modems which central station was selected to receive a response; and
(F) means permitting transmission from a remote station associated with the selected central station through the corresponding port of the remote modem to which the remote station is connected in response to a signalled indication of the selected one of the plurality of central stations.

26. A multiport/multidrop communications system as defined in claim 25 wherein the means for detecting which one or more central stations desires a response comprises means monitoring outbound transmissions from the central stations.

27. A multiport/multidrop communications system as defined in claim 26 wherein the monitoring means monitors for a line idle condition in the outbound transmissions from the central stations.

28. A multiport/multidrop communications system as defined in claim 26 wherein the monitoring means monitors for a line idle code in the outbound transmissions from the central stations.

29. A multiport/multidrop communications system as defined in claim 26 wherein the monitoring means monitors data transmissions from the central stations for invitations to respond.

30. A mulitport/multidrop communications system as defined in claim 25 wherein the means for selecting one of the central stations includes means establishing a priority among the central stations and for selecting the highest priority central station desiring a response from one of its associated remote stations.

31. A multiport/multidrop communications system as defined in claim 30 wherein the means for selecting a central station includes a timer and is adapted to select the next highest priority central station that has been detected as desiring a response from one of its associated remote stations if the first selected central station does not receive a response within the timer interval.

32. A multiport/multidrop communications system as defined in claim 30 wherein the means for selecting one of the central stations that has been detected as desiring a response from one of its associated remote stations includes means monitoring inbound transmissions to the first selected central station and selecting the next highest priority central station that has been detected as desiring a response when inbound data transmission to the first selected central station is complete.

33. A multiport/multidrop communications system as defined in claim 25 wherein the means for selecting one of the central stations that has been detected as desiring a response from one of its associated remote stations includes means monitoring inbound transmissions to the first selected central station and selecting the next highest priority central station that has been detected as desiring a response when inbound data transmission to the first selected central station is complete.

34. A multiport/multidrop communications system as defined in claim 25 wherein the means for selecting one of the central stations that has been detected as desiring a response from one of its associated remote stations includes means establishing a rotating priority among the central stations and is adapted to select the next central station that has been detected as desiring a response from one of its associated remote stations according to the rotating priority.

35. A multiport/multidrop communications system as defined in claim 25 wherein the means for detecting which one or more central stations desires a response from one of its associated remote stations includes means monitoring request to send signals from the central stations.

36. A multiport/multidrop communications system as defined in claim 35 wherein the means for signaling to the remote modems which central station was selected includes means associated with the central modem for simulating a carrier drop signal at the remote modems.

37. A multiport/multidrop communications system as defined in claim 36 wherein the means permitting transmission from a remote station associated with the selected central station is logic means combining a request to send signal from the remote station desiring to respond with the simulated carrier drop signal.

38. A multiport/multidrop communication system as defined in claim 36 wherein the means for selecting one central station that has been detected as desiring a response from a remote station to receive inbound transmission operates to select the next central station that has been detected as desiring a response from a remote station when the request to send signal from the previously selected central station indicates its inbound transmission is complete.

39. A multiport/multidrop communications system as defined in claim 36 wherein the means for selecting a central station that has been detected as desiring a response from a remote station includes a timer and is adapted to select the next highest priority central station that has been detected as desiring a response from one of its associated remote stations if the first selected central station does not receive a response within the timer interval.

40. A multiport/multidrop communication facility as defined in claim 25 wherein the communications facility is a full duplex telephone line facility.

* * * * *